Oct. 14, 1941.  M. LOISEAU  2,258,779

STEAM HEATING SYSTEM FOR VEHICLES

Filed March 23, 1939  2 Sheets-Sheet 1

INVENTOR
MAURICE LOISEAU
BY
ATTORNEY

Oct. 14, 1941.  M. LOISEAU  2,258,779

STEAM HEATING SYSTEM FOR VEHICLES

Filed March 23, 1939  2 Sheets—Sheet 2

INVENTOR
MAURICE LOISEAU
BY
ATTORNEY

Patented Oct. 14, 1941

2,258,779

UNITED STATES PATENT OFFICE 2,258,779

STEAM HEATING SYSTEM FOR VEHICLES

Maurice Loiseau, Paris, France, assignor, by mesne assignments, to The Westinghouse Air Brake Company, Wilmerding, Pa., a corporation of Pennsylvania Application March 23, 1939, Serial No. 263,608
In France July 21, 1938

2 Claims. (Cl. 219—39)

This invention relates to heating systems for railway and like vehicles of the kind comprising steam heating devices for heating the air in or supplied to the interiors of the vehicles, and has for its object to provide an improved heating system of this character which shall enable a vehicle to be effectively and conveniently heated when utilized either for steam or electric traction.

According to the principal feature of the invention, each of the vehicles to be heated is provided with any suitable steam radiator or other heating arrangements, and in addition with an electrically operated steam generator from which the heating arrangements are supplied with steam when the vehicle is being utilized for electric traction, suitable automatic arrangements for the control of the electric steam generation being preferably provided.

Figure 1:
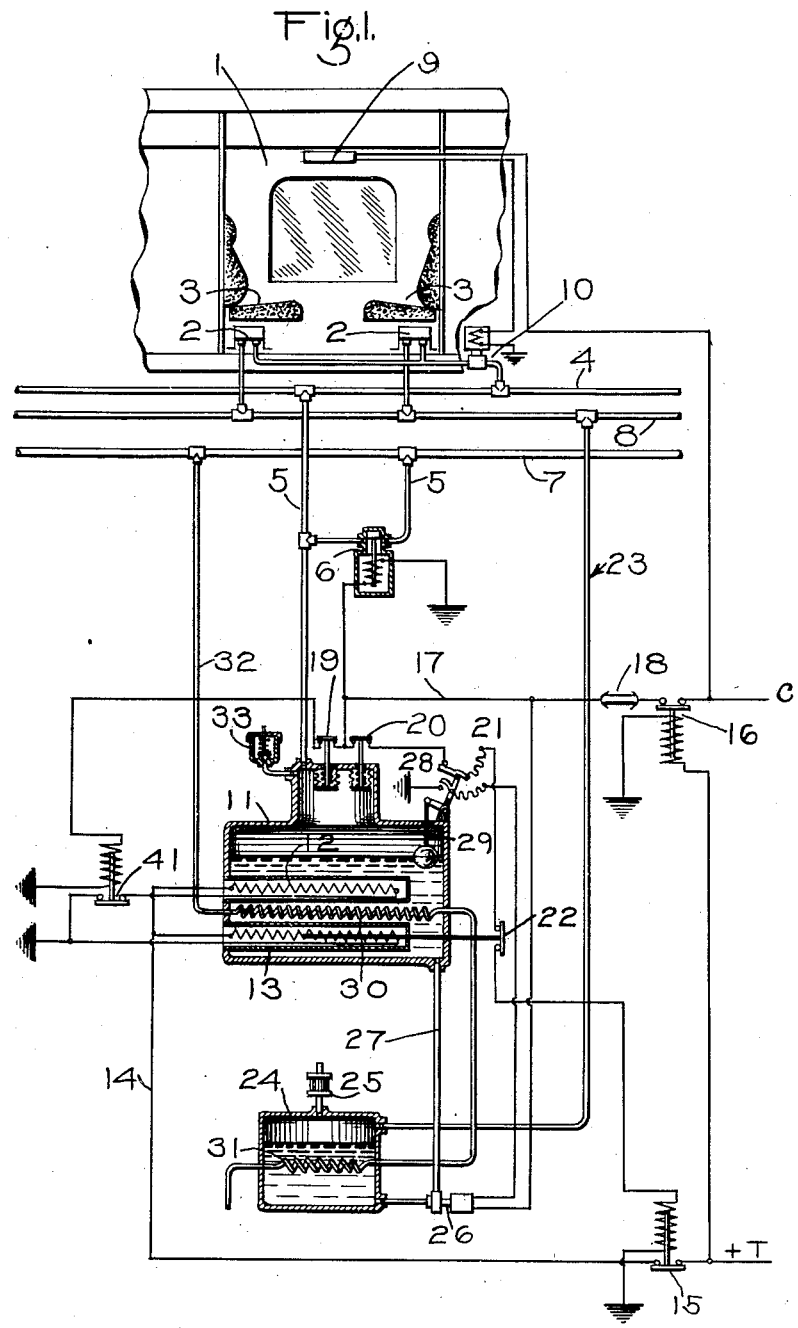
Figure 2:
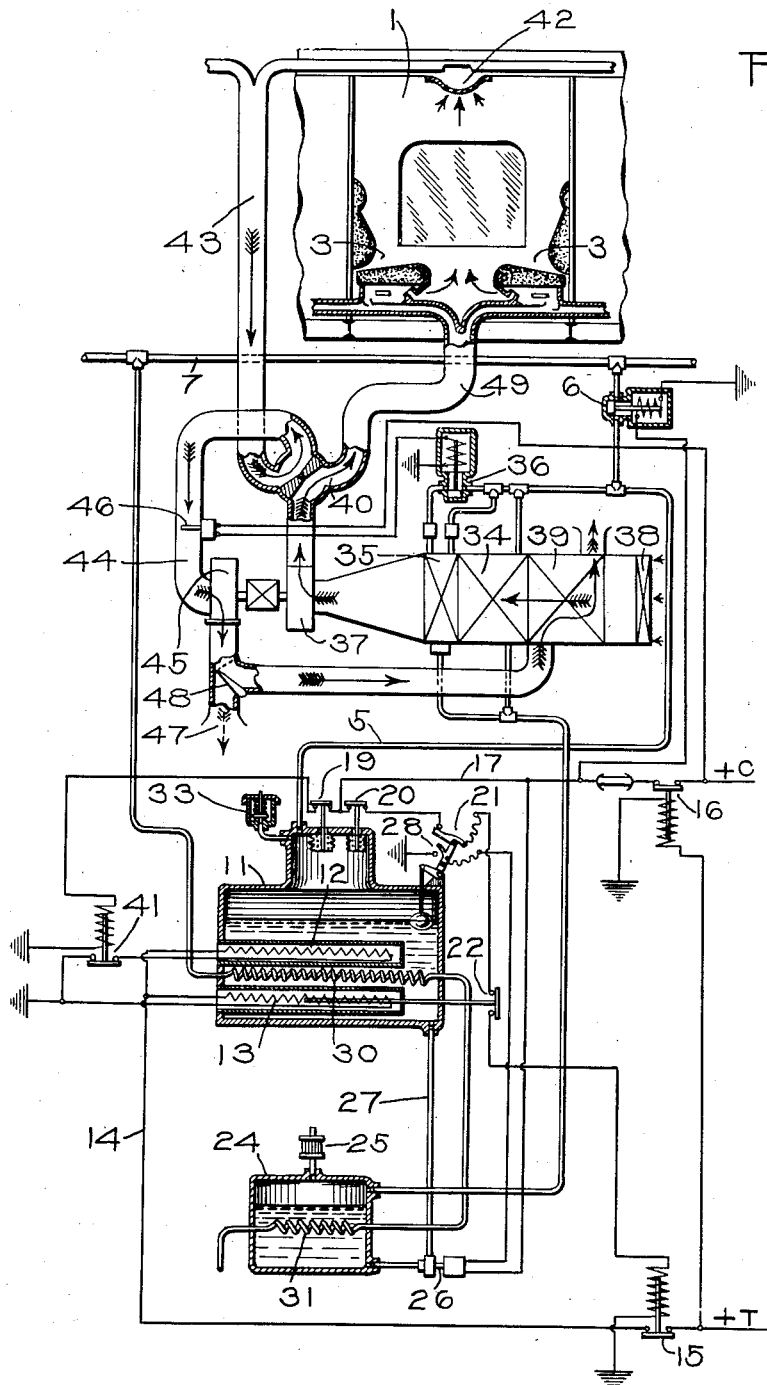

The invention is illustrated by way of example in the accompanying drawings, of which Fig. 1 is a diagrammatic view of a system of heating apparatus embodying one form of the invention as applied to a compartment of a railway vehicle provided with steam radiators located within the compartment, Fig. 2 being a similar view illustrating the invention as applied to a vehicle compartment to which heated air is arranged to be supplied from the exterior.

Referring now first to Fig. 1 it will be seen that the compartment to be heated is indicated at 1 as provided with a steam radiator 2 of the usual type located under each of the seats 3 of the compartment. The radiators 2 are arranged to be supplied with steam from a pipe 4 arranged below the compartment and communicating through a branch pipe 5 and an electrically operated cut-off valve 6 with the usual main steam supply pipe 7 extending throughout the train. An exhaust pipe 8 for the cooled steam and water of condensation leaving the radiators 2 is also provided underneath the compartment 1, and the supply of steam to the radiators from the pipe 4 is arranged to be automatically controlled in accordance with the temperature of the compartment by means of a thermostatic device 9 of any suitable type, which in the example illustrated is shown as controlling an electrically operated supply valve 10.

The electrically heated steam generator comprises a boiler 11 provided with two resistant heating elements 12 and 13, one terminal of each of which is connected through a wire 14 and an electrically operated control switch 15 to a traction current supply circuit conductor T which is energized or connected to a suitable source of power when the vehicle is being electrically driven.

A relatively low tension source of electric current for control purposes is provided on the vehicle, one terminal of this source being indicated at C while the other terminal is grounded.

An electrically operated switch 16 controls the supply of current from the terminal C to a wire 17, a removable plug switch 18 being also provided for disconnecting the control circuits of the vehicle from the terminal C where required.

The boiler 11 is provided with two pressure controlled switches 19 and 20, adapted to open their normally closed switch contacts when the steam pressure within the boiler 11 attains correspondingly different values. The switch 19 controls the supply of energizing current from the wire 17 to an electrically operated switch 41 controlling the connection to ground of the heating element 12.

The contacts of the other pressure controlled switch 20 are connected in a circuit leading from the wire 17 to the operating coil of the control switch 15, this circuit also including the contacts of a switch 21, which is adapted to be actuated by means of a float device 29 in accordance with variations in the level of water in the boiler 11, and contacts of a thermostatic switch 22 located at the boiler 11. The switch 22 is adapted to assume circuit-opening position in response to a predetermined increase in boiler temperature.

A branch pipe 23 leads from the pipe 8 to the upper part of a water chamber or tank 24 in which the water of condensation from the radiators 2 is collected, the chamber 24 being also provided with a condenser device 25 of any suitable type by means of which exhaust steam entering the chamber 24 is condensed.

The water collecting in the chamber 24 is adapted to be returned to the boiler 11 by means of an electrically driven pump 26 and a pipe 27, the operating circuit of the pump motor being controlled by a switch 28.

The switches 21 and 28 are connected together and are arranged to be operated by means of the float mechanism 29 in such a manner that the switch 21 is opened in the event of the water level in the boiler 11 falling below a predetermined minimum value, while the switch 28, by opening and closing the operating circuit of the pump 26 as the level of water in the boiler varies, insures the maintenance of a substantially constant level therein.

A heating coil pipe 30 is provided in the boiler 11 and a similar coil pipe 31 is provided in the tank 24, the pipes 30 and 31 being supplied with steam from the main pipe 7 through a pipe 32 and serving to maintain the water in the boiler and in the tank at a temperature above the freezing point when the electric heating of the boiler is inoperative under non-electric traction service.

The operation of the system is as follows: When the vehicle is not being electrically driven, being coupled for instance in a train driven by a steam locomotive, the terminal T of the electric traction circuit is deenergized so that the switch 16 is open. The energizing circuit for the switch 15 from the terminal C is consequently open while the operating circuit for the heating elements 12 and 13 of the boiler 11 is interrupted at the switch 15, and the boiler 11 is thus rendered inoperative.

With the switch 16 open, the operating winding of the valve 6 is deenergized so that this valve is open and maintains communication between the main supply pipe 7 and the pipe 4. Steam is thus supplied under these conditions from the pipe 4 to the radiators 2 under the control of the thermostatic device 9, which may however be omitted if desired.

Under these conditions it will be seen that the system is operating as an ordinary steam heating system, the boiler 11 being inoperative and the water therein and in the tank 24 being prevented from freezing by the action of the heating coils 30 and 31.

When, on the other hand, the vehicle is being electrically driven, the terminal T is connected to a source of power and by the consequent supply of current to the operating winding of the switch 16 this switch is closed and energizes the wire 17 from the terminal C. The cut-off switch 6 interposed in pipe 5 will, therefore, be energized to cut off communication between the main pipe 7 and the pipe 4.

At the same time, the pressure-controlled switches 19 and 20 are closed since the pressure in the boiler 11 is below the predetermined pressure, and since the boiler is relatively cool the thermostatic switch 22 will be in its normal or closed condition.

Assuming that the water level in the boiler 11 is sufficiently high, the switch 21 will also be closed, and under these conditions current will be supplied from the wire 17 through switches 20, 21 and 22 to energize the operating coil of switch 15, which will be consequently held in circuit-closing position.

Current will also be supplied from the wire 17 through the closed switch 19 to the operating coil of switch 41, which is thereby closed.

Heating current will now be supplied from the source of power to the grounded heating element 13 through the circuit including the conductor T, closed switch 15 and wire 14, and to the heating element 12 through the same circuit, this element being grounded by way of the closed switch 41, so that the two heating elements are thus supplied with operating current in parallel with one another.

Steam will now be generated in the boiler 11 under the heat supplied by the elements 12 and 13, and will flow through the pipe 5 to the pipe 4 and thence to the radiators 2 under the control of the valve 10, the cooled steam and water of condensation from the radiators 2 being returned to the tank 24 through the pipes 8 and 23.

When the pressure in the boiler 11 attains a value corresponding to the adjustment of the switch 19, the latter will be opened and the switch 41 will be consequently deenergized. The circuit of the heating element 12 will thus be interrupted at the switch 41 and the heating element 13 only will continue to operate.

In the event of the steam pressure within the boiler 11 increasing still further, the pressure responsive switch 20 will open and will interrupt the energizing circuit of the switch 15. The circuit of the heating element 13 will consequently be interrupted and the further supply of heat to the boiler 11 will cease.

As soon as the boiler pressure is reduced, due for example to increased steam demand by the radiators 2, the pressure-controlled switch 20 will be reclosed and will effect the reclosure of the switch 15 to supply heating current to the element 13. Further reduction in boiler pressure will in turn effect the reclosure of the switch 19, thereby reclosing switch 41 and restoring heating current to the element 12.

It will thus be evident that the supply of heat to the boiler 11 is automatically regulated in accordance with the steam requirements of the radiators 2.

In the event of the water level in the boiler 11 falling below a predetermined minimum height, or of the boiler becoming overheated, the energizing circuit of the switch 15 will be interrupted at the switch 21 or at the switch 22 and the supply of heating current to the elements 12 and 13 will thus be cut off.

The boiler for further security may be provided with a safety valve 33 and the operation of the switch 21 may be arranged to actuate a suitable visible or audible indicator, not shown.

It will be understood that the radiators 2 may be manually or thermostatically controlled or both, and may be operated at atmospheric or a higher pressure. In the latter case the condensation tank 24 may be omitted.

Referring now to the system shown in Fig. 2, it will be seen that the arrangements for controlling the supply of heat to the boiler 11 are the same as in the system of Fig. 1.

The steam supply pipe 5 from the boiler 11 is, however, in this system arranged to supply an air-moistening device 34 and an air-heating device 35. The steam supplied to the heating device 35 is arranged to be automatically controlled by means of an electrically operated valve 36 through which a portion of the steam supplied to the device 35 passes as shown.

The air supplied to the vehicle compartment 1 is arranged to be conveyed thereto by the action of a suitable fan 37, the air being drawn in from the atmosphere through a filter device 38, and passing through a heat-exchanger 39 and the humidifying and heating devices 34 and 35 on its way to the fan 37. After leaving the fan 37, the heated and moistened air passes through a valve 40 to a conduit 49 from which it is discharged into the compartment 1 below the seats 3 or in any other suitable manner.

Air is adapted to be withdrawn from the compartment 1 through a roof ventilator 42, a conduit 43, the valve 40 and a conduit 44 by means of a fan 45, and is eventually discharged to the atmosphere through the heat exchanger 39, which in the usual manner enables some of the heat still contained in the air leaving the compartment 1 to be recovered and utilized for heating the incoming air on its way to the device 34.

The control of the electrically operated valve 36 is arranged to be effected by a thermostatic device 46 located in the conduit 44 and responsive to variations in the temperature of the outgoing air from the compartment 1 as will be readily understood without further explanation.

In warm weather, when the supply of steam to the devices 34 and 35 is cut off, the setting of the valve 40 may be reversed from the position shown so that fresh air will be supplied to the compartment 1 by the pump 37 through the conduit 43 and the roof ventilator 42, air being withdrawn from the compartment through the conduit 49, the valve 40, conduit 44, and the pump 45 from which this air is discharged directly into the atmosphere through an outlet 47 and past a valve 48, which under these conditions is adjusted so as to cut off the passage of the air to the heat-exchanger device 39.

It will be apparent that the invention enables the existing radiator or other steam heating arrangements for a vehicle to be retained and operated either for electric or non-electric service, the operation of these arrangements being effectively controlled under either conditions. Furthermore the operation of the systems of the invention under electric traction is not appreciably affected by voltage variations since the control of the heating of the vehicle is effected in the steam portion of the apparatus. Considerable simplification and saving in cost is thereby effected as compared with other heating systems of the combined steam and electric type.

It will be understood that the invention is not limited to the particular systems above described and illustrated by way of example and various modifications therein may be made without exceeding the scope of the invention.

Having now described my invention, what I claim as new and desire to secure by Letters Patent, is:

1. In a heating system for a vehicle, in combination, radiator apparatus, a boiler device adapted to supply vapor thereto, a condensate reservoir adapted to receive liquid from said radiator apparatus, electrical heating means for said boiler device, and control apparatus therefor comprising electroresponsive pump means operative to return liquid from said reservoir to said boiler device, a control circuit, a relay operative when deenergized to open said control circuit, a power circuit through which current may be supplied for energizing said relay, a supply relay adapted to be energized for connecting said electrical heating means to said power circuit, a first branch circuit for connecting said control circuit to said supply relay, switch means responsive to boiler pressure and temperature for controlling said first branch circuit, a second branch circuit for connecting said control circuit to said pump means, and switch means responsive to a predetermined fall in the level of liquid in said boiler to open said first branch circuit while closing said second branch circuit.

2. In a heating system for a vehicle, in combination, a boiler device adapted to supply heat vapor to the heating system of the vehicle, a plurality of electrical heating means for heating said boiler device, a relay operative to render one of said electrical heating means operative to heat said boiler device, a second relay operative to render another of said electrical heating means operative to heat said boiler device, a first pressure responsive means responsive to one degree of pressure of vapor within said boiler for controlling one of said two relays, and a second pressure responsive means responsive to a different degree of pressure of vapor within said boiler device for controlling the other of said relays.

MAURICE LOISEAU.